United States Patent
Soder et al.

(10) Patent No.: US 11,594,914 B2
(45) Date of Patent: *Feb. 28, 2023

(54) METHOD FOR PRODUCING A SYSTEM FOR INDUCTIVELY TRANSMITTING ENERGY TO A MOBILE PART, AND DEVICE FOR CARRYING OUT THE METHOD

(71) Applicant: SEW-EURODRIVE GMBH & CO. KG, Bruchsal (DE)

(72) Inventors: Johann Soder, Hambrucken (DE); Nils-Malte Jahn, Heidelberg (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/398,049

(22) Filed: Aug. 10, 2021

(65) Prior Publication Data
US 2021/0367449 A1 Nov. 25, 2021

Related U.S. Application Data

(63) Continuation of application No. 16/603,505, filed as application No. PCT/EP2018/025064 on Mar. 20, 2018, now Pat. No. 11,101,692.

(30) Foreign Application Priority Data

Apr. 7, 2017 (DE) .................... 10 2017 003 498.2

(51) Int. Cl.
*H02J 50/00* (2016.01)
*H02J 50/90* (2016.01)
(Continued)

(52) U.S. Cl.
CPC ............ *H02J 50/005* (2020.01); *B60L 53/12* (2019.02); *B60L 53/30* (2019.02); *H01F 27/02* (2013.01);
(Continued)

(58) Field of Classification Search
CPC .. H02J 50/90; H02J 50/10; H02J 50/12; H02J 50/005; H01F 27/02; H01F 38/14;
(Continued)

(56) References Cited

U.S. PATENT DOCUMENTS 9,327,608 B2  5/2016 Gibbons, Jr.
9,796,272 B2  10/2017 Richards
(Continued)

FOREIGN PATENT DOCUMENTS

DE        3700488 A1   7/1988
DE  10 2006 025 460 A1  12/2007
(Continued)

*Primary Examiner* — Ryan Johnson
(74) *Attorney, Agent, or Firm* — Carter, DeLuca & Farrell LLP

(57) ABSTRACT

In a method for producing a system for inductively transmitting energy to a mobile part, and a device for performing the method: a stepped bore is introduced into a floor; a sealing element is introduced into the stepped bore; a ring frame is held in place in the stepped bore with the aid of an alignment unit supported on the surface of the floor, the upper edge of the ring frame in particular being aligned with the height of the floor or with the surface of a floor covering applied to the floor, i.e. the upper edge in particular being brought to the same height position as the surface of the floor or the floor covering; the ring frame is set apart from the floor so that a gap region exists between the ring frame and the floor; casting compound is filled into the gap region; the alignment unit is removed; and a primary part is accommodated in the ring frame, in particular connected with the aid of screws.

20 Claims, 12 Drawing Sheets

(51) Int. Cl.
*H02J 50/10* (2016.01)
*H02J 50/12* (2016.01)
*B60L 53/12* (2019.01)
*B60L 53/30* (2019.01)
*H01F 27/02* (2006.01)
*H01F 38/14* (2006.01)

(52) U.S. Cl.
CPC .............. *H01F 38/14* (2013.01); *H02J 50/10* (2016.02); *H02J 50/12* (2016.02); *H02J 50/90* (2016.02)

(58) Field of Classification Search
CPC .......... B60L 53/12; B60L 53/30; B60L 53/38; Y02T 90/12
See application file for complete search history.

(56) References Cited

U.S. PATENT DOCUMENTS

| | | |
|---|---|---|
| 10,622,142 B2 | 4/2020 | Bohm et al. |
| 10,763,024 B2 | 9/2020 | Shijo et al. |
| 11,101,692 B2 * | 8/2021 | Soder ...................... B60L 53/12 |
| 2010/0235006 A1 | 9/2010 | Brown |
| 2015/0364938 A1 | 12/2015 | Lapetina et al. |

FOREIGN PATENT DOCUMENTS

| | | |
|---|---|---|
| DE | 102012202472 A1 | 8/2013 |
| DE | 102013007850 A1 | 11/2014 |
| DE | 102014000347 A1 | 7/2015 |
| FR | 2775383 A1 | 8/1999 |
| WO | 2011154993 A1 | 12/2011 |

\* cited by examiner

METHOD FOR PRODUCING A SYSTEM FOR INDUCTIVELY TRANSMITTING ENERGY TO A MOBILE PART, AND DEVICE FOR CARRYING OUT THE METHOD

CROSS-REFERENCE TO RELATED APPLICATIONS

The present application is a continuation of U.S. patent application Ser. No. 16/603,505, which is the national stage of PCT/EP2018/025064, having an international filing date of Mar. 20, 2018, and claims priority to Application No. 102017003498.2, filed in the Federal Republic of Germany on Apr. 7, 2017, each of which is expressly incorporated herein in its entirety by reference thereto.

FIELD OF THE INVENTION

The present invention relates to a method for producing a system for inductively transmitting energy to a mobile part, and to a device for carrying out the method.

BACKGROUND INFORMATION

In certain conventional systems, energy is inductively transmittable from a primary part to a secondary winding.

SUMMARY

Example embodiments of the present invention provide for improving the safety in a system for inductive charging.

According to an example embodiment of the present invention, in a method for producing a system for inductively transmitting energy to a mobile part, a stepped bore is introduced into a floor in a first method step, in a following, second method step, a sealing element is introduced into the stepped bore, in a following, third method step, a ring frame is held in place in the stepped bore with the aid of an alignment unit that is supported on the surface of the floor, the upper edge of the ring frame in particular being aligned with the height of the floor or the surface of a floor covering attached to the floor, the upper edge thus in particular being brought to the same height position as the surface of the floor or the floor covering, the ring frame is set apart from the floor so that a gap region exists between the ring frame and the floor, in a following, fourth method step, casting compound is filled into the gap region, in a following, fifth method step, the alignment unit is removed, and in a following, sixth method step, a primary part is accommodated in the ring frame, in particular connected by screws.

This offers the advantage that an alignment of the ring frame with the surface of the floor, in particular at the precise height of the floor covering on the floor, is able to be carried out. The primary part is therefore easily connectable to the ring frame, and the creation of a tripping hazard is prevented. This absence of barriers thus reduces an accident risk and therefore ensures better safety.

According to example embodiments, the sealing element rests against the stepped bore, in particular against an area of the stepped bore that is situated below the step of the stepped bore, in particular is pressed against it, and against the ring frame, in particular the inner wall of the annular ring frame. This offers the advantage that the sealing element prevents the seepage of casting compound into the space region of the stepped bore intended for the primary part and/or for its feed line. The sealing element is produced either from an elastic plastic material, such as foam material, and is provided with a central hole, or the sealing element is able to be inflated so that it comes into contact with the lower region of the stepped bore when inflated and rests against the inner wall of the ring frame. In any event, the gap region between the ring frame and the floor provided for the casting compound is also restricted at least by the sealing element.

According to example embodiments, the primary part has a winding, in particular, an electrical feed line for the winding is situated in a corrugated tube, which terminates in the region situated below the step of the stepped bore. This offers the advantage that the feed line for conveying a medium-frequency alternating current may be placed so that it is well protected with respect to the charge point, i.e. also the primary part.

According to example embodiments, the alignment unit is aligned with the surface of the floor covering of the floor. This has the advantage that an alignment with the surface is possible, and thus with the floor level of the floor covering.

According to example embodiments, the ring frame is situated above the step of the stepped bore. This is considered advantageous insofar as the primary part is able to be installed in a precise manner.

According to an example embodiment of the present invention, a device for carrying out the method described above includes a primary part which is situated in a stepped bore introduced into a floor, the alignment unit has a disk on which radially extending arms are situated on which an adjustment screw is located in each case, and/or a ring frame is held in place in the stepped bore introduced into the floor with the aid of a casting compound, in particular in an integral or a positively engaged manner, the primary part is connected to the ring frame, in particular with the aid of screws.

This has the advantage that the device is easy to produce and the primary part is precisely installable, and the installation height, in particular, is therefore precisely adapted to the surface of the floor, in particular the floor covering.

According to example embodiments, the primary part has a receiving part whose upper side is covered by a cover part provided with a spiral-shaped groove on its side facing the receiving part, in which the winding is accommodated, the winding in particular being developed as a flat winding, a ferrite layer is situated on the side of the winding facing the receiving part, the ferrite part in particular being made up of cuboidal ferrite parts. This offers the advantage that the primary part may have a round configuration and thus is adapted to the stepped bore. However, despite the round shape, a winding which may be arranged as a rectangular/spiral-shaped winding, which thus is not isotropic in the driving plane of the mobile part, is able to be accommodated. A high inductive coupling degree is therefore achievable between the primary part and the secondary winding because the likewise non-isotropic secondary winding is considered particularly advantageous for the inductive charging from a long primary conductor installed along the driving path. In other words, the charging is not only possible from the charge points described herein but also from long installed primary conductors. The winding of the primary part of the charge point and the secondary winding of the mobile part thus have a preferred direction in each case.

However, in a system in which charging is to be carried out only at the charge points, the winding in the primary part may be arranged as a flat winding in the form of a circular spiral, i.e. without a preferred direction. Charging of the mobile part while the mobile part executes a rotation over the charge point is therefore possible. Toward this end, the mobile part has an omnidirectional drive, and thus is able to turn on the spot. The axis of rotation is, for example, aligned coaxially to the axis of the stepped bore.

According to example embodiments, a lower part is connected to the receiving part on the side of the receiving part facing away from the cover part, a space region, in particular an annular space region circumferential in the circumferential direction, is arranged between the receiving part and the lower part, in which a circuit board is situated which is fitted with at least one capacitor system. This offers the advantage that an electrical compensation is able to be placed in the space region.

According to example embodiments, the lower part is connected to the receiving part by screws, and the cover part is connected to the ring frame with the aid of screws that extend through the receiving part. This is considered advantageous as it allows for a simple connection.

According to example embodiments, a further space region is provided between the receiving part and the lower part, which is set apart from the in particular circumferential, annular space region in the circumferential direction and which is particularly situated at a smaller radial distance from the center axis of the stepped bore. This offers the advantage that an illumination device may be provided in this further space region, which is centrally situated, i.e. in the region of the axis of the stepped bore.

According to example embodiments, a controllable illumination device, in particular an LED, is situated in the further space region, the receiving part has an uninterrupted bore, in particular in the direction of the illumination device, which is either kept free or is filled with a transparent material, and the cover part is made from a transparent material. This offers the advantage that information, e.g., the operating status of the primary part, is optically displayable.

According to example embodiments, the capacitor system is connected to the winding in series or in parallel and dimensioned so that the resonant frequency of the oscillating circuit formed in this manner substantially corresponds to the frequency of the alternating current impressed into the oscillating circuit or the winding. This is considered advantageous insofar as a high degree of efficiency is able to be achieved.

According to example embodiments, a cable gland is situated at the underside of the lower part, to which the supply line is routed. This has the advantage that a protected feed of the supply line is able to be attained.

According to example embodiments, the receiving part, the cover part and the lower part have a circular outer edge region, and/or a maximum radial distance, which is independent of the circumferential angle. This offers the advantage that the primary part may be accommodated in the ring frame which is situated in the stepped bore arranged in the form of a round bore. This simplifies the production.

According to example embodiments, the winding has a preferred direction, which is aligned parallel to the driving plane of the mobile part, and/or the maximum radial distance of the winding has different values as a function of the circumferential angle. This offers the advantage that although optimal charging of the mobile part is possible in only one alignment of the mobile part, in which the preferred direction of the secondary winding of the mobile part is oriented parallel to the preferred direction of the winding of the primary part, charging is also possible while driving along a long installed primary conductor.

In an alternative arrangement of the winding without a preferred direction, i.e. as a circular flat winding which is aligned coaxially with the axis of the stepped bore, charging during the rotary motion of the mobile part is possible without fluctuations in the inductive coupling strength between the winding and secondary winding. The axis of rotation must then have a coaxial alignment with the axis of the stepped bore. Toward this end, the mobile part has, for example, omnidirectional wheels or a tank drive. A rotation in place is therefore executable.

According to an example embodiment of the present invention, in a system for the contactless transmission of energy from a primary part situated on the floor to a mobile part that is able to move on the floor, in particular for carrying out a previously mentioned method, a ring frame is held in place in a stepped bore introduced into the floor by a casting compound, in particular in an integral and/or positive manner, and the primary part is connected to the ring frame, in particular by screws.

This offers the advantage that a precise accommodation of the primary part in the ring frame is easily accomplished.

Further features and aspects of example embodiments of the present invention are described in greater detail below with reference to the appended Figures.

DETAILED DESCRIPTION

Figure 1:
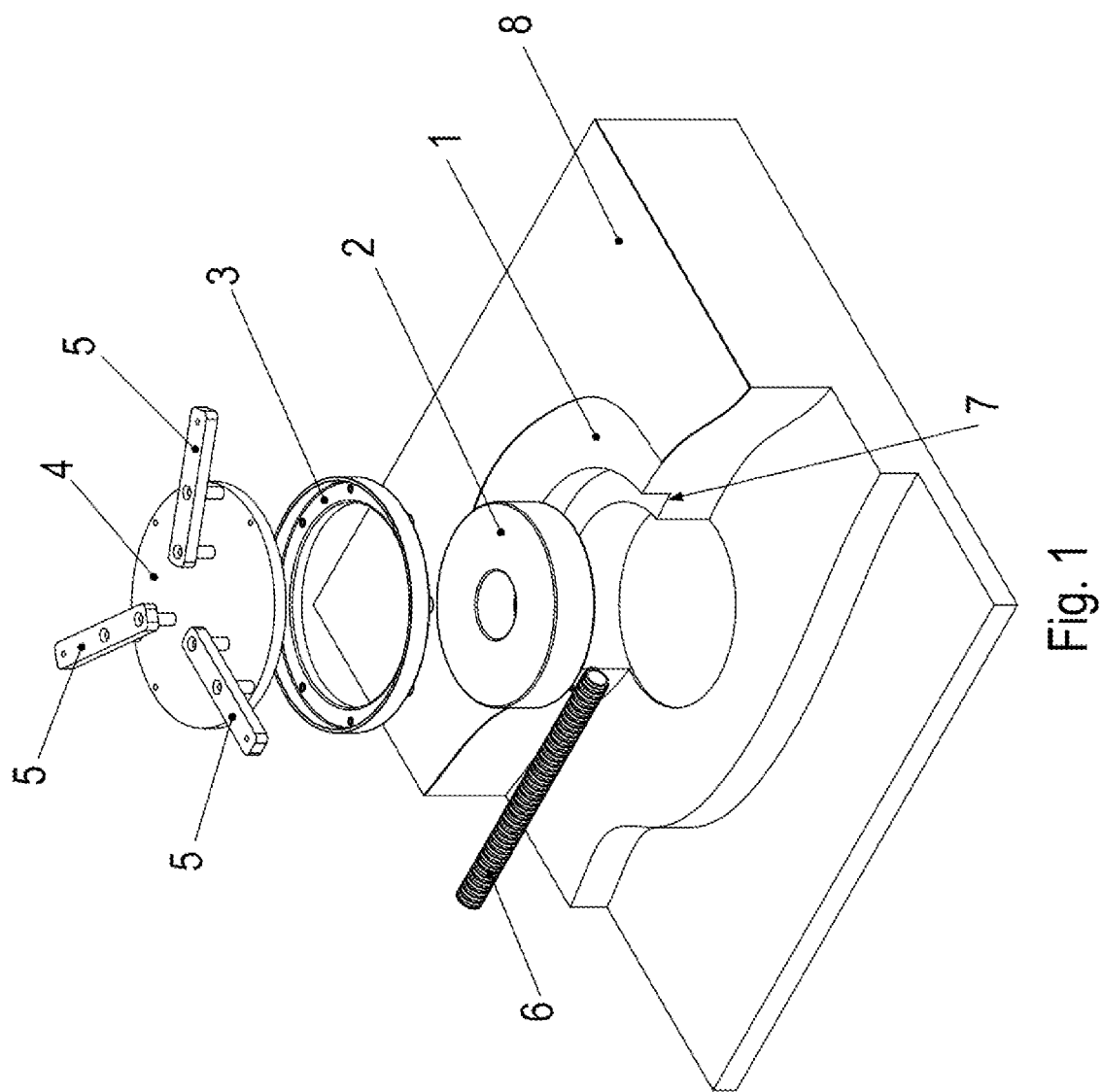
FIG. 1 is an exploded perspective partial cross-sectional view of a production step for producing a primary unit, in particular a charging point, of a system for an inductive transmission of energy to a mobile part, a ring frame 3 being aligned at the edge of a stepped bore with the aid of an alignment unit.
Figure 2:
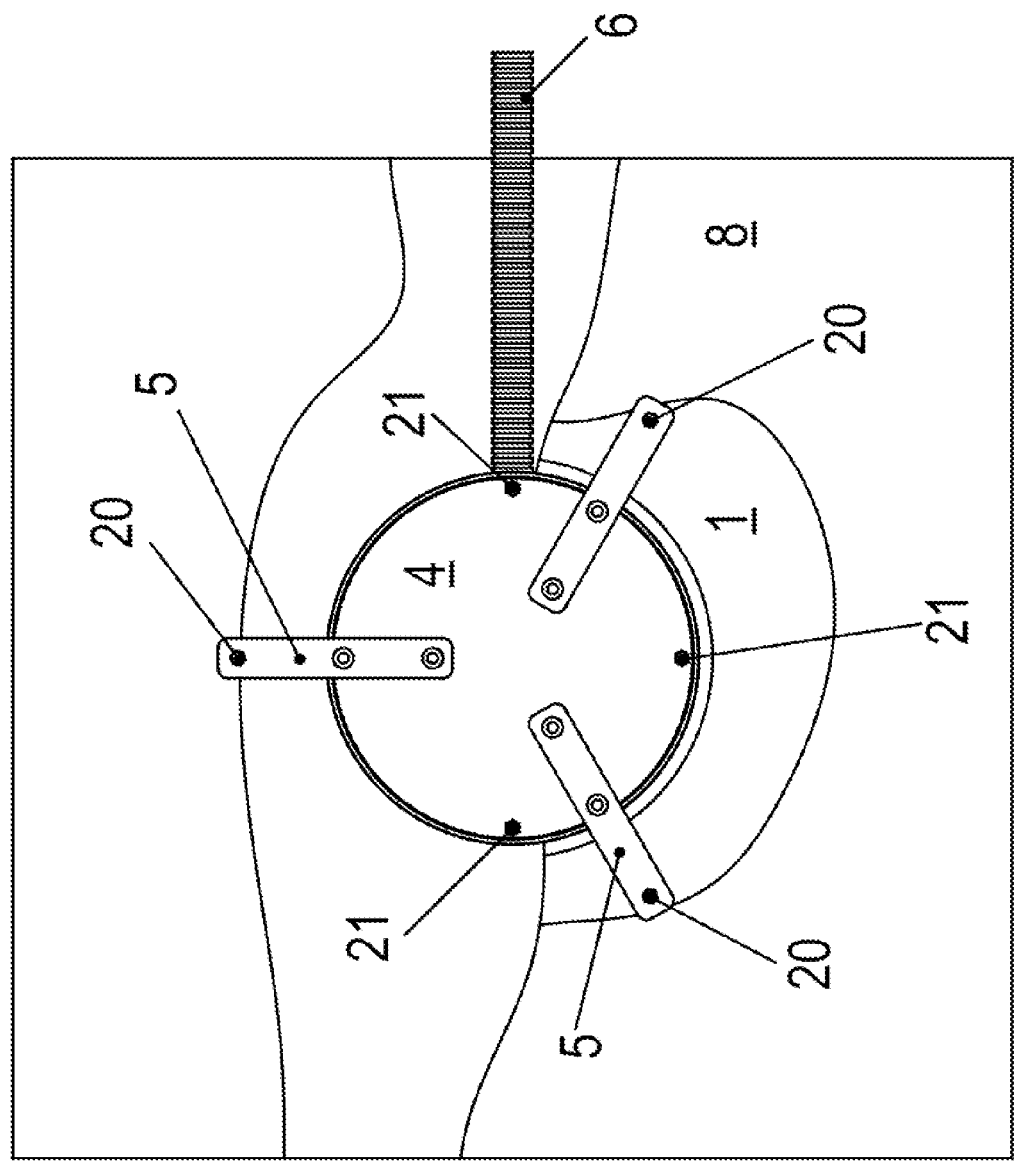
FIG. 2 is an associated plan view of the assembly.
Figure 3:
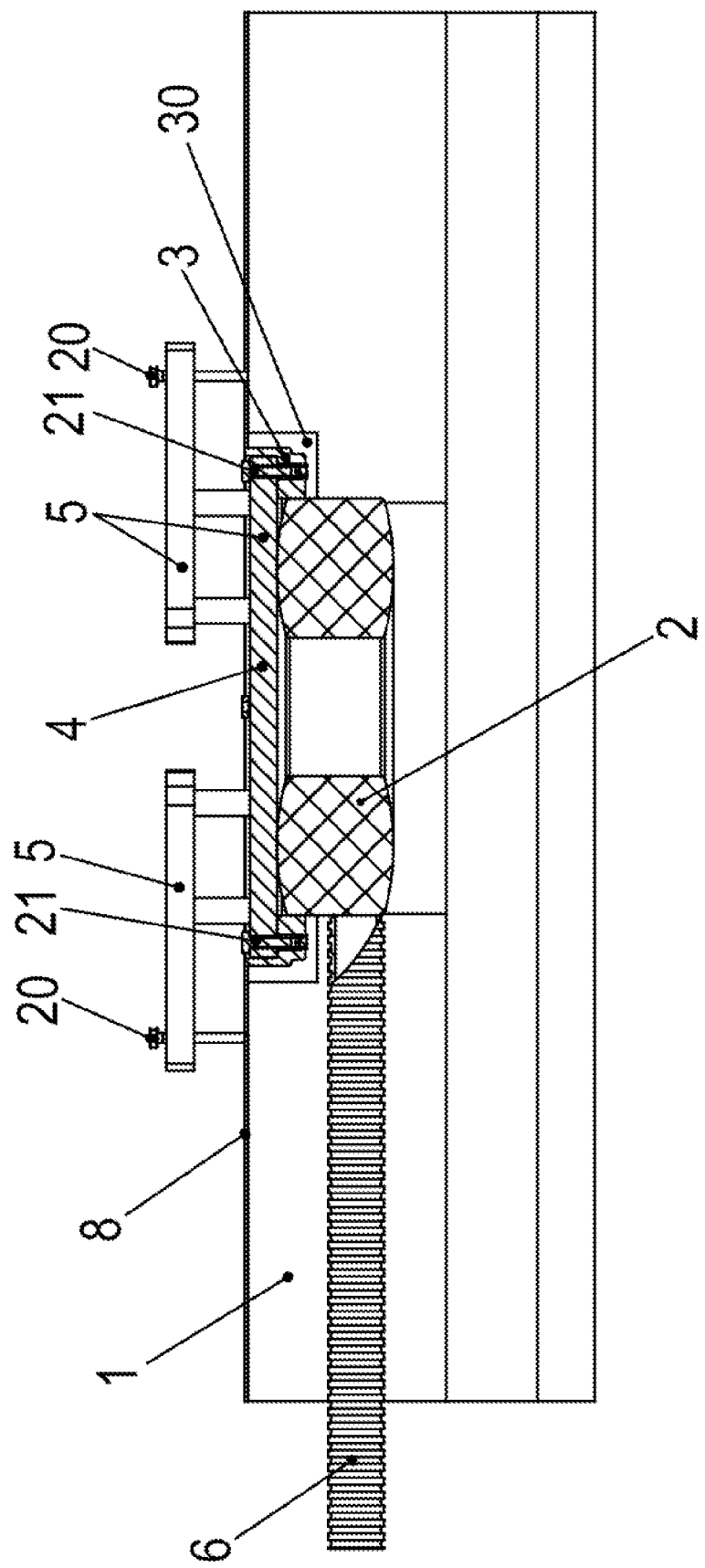
FIG. 3 is an associated cross-sectional view.
Figure 4:
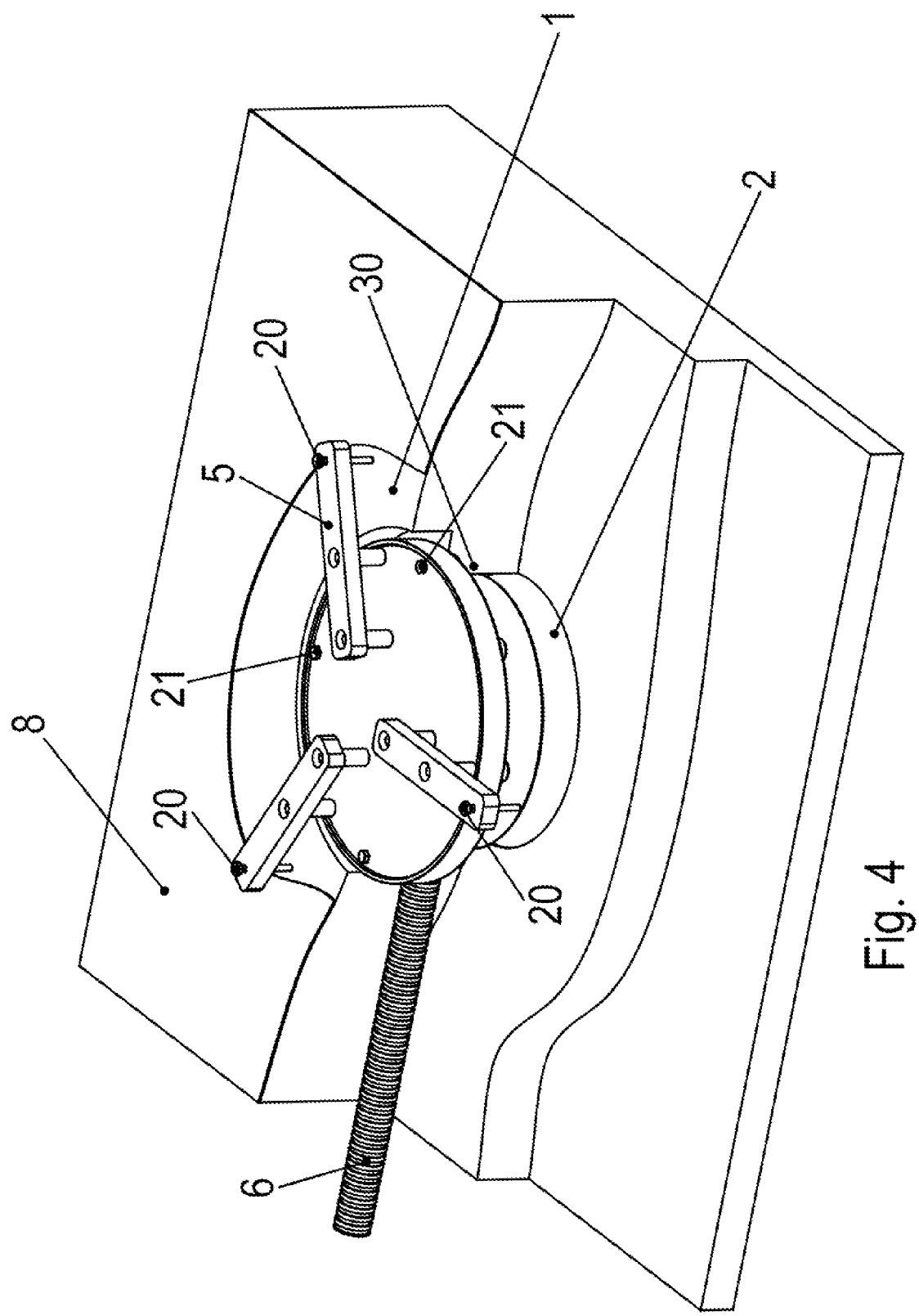
FIG. 4 is a perspective view through a partial cross-sectional representation of the assembly.

As illustrated in the Figures, a primary unit is situated on the floor, this primary unit having a winding 61 into which a medium-frequency current is impressed. A mobile part that is parked or turning above the primary unit, i.e. in particular the charging point, is thus inductively chargeable with energy. Toward this end, the mobile part includes a secondary winding on its underside to which a capacity is connected in parallel or in series so that the resonant frequency of the oscillating circuit formed in this manner corresponds to the frequency of the current impressed into winding 61.

To produce the charging point, a core drilling is first performed in floor material 1, in particular concrete. The floor has a floor covering 8 on its top surface, on which the mobile part is able to drive.

In order to keep the charging point free of barriers, i.e. not to create a tripping hazard, ring frame 3 is first aligned and held in place by an alignment unit. The alignment unit is supported at the edge of the bore.

The alignment unit has a disk 4 on whose upper side arms 5 extend in the radial direction in each case. Using axially oriented adjustment screws, the alignment unit is supported at the edge region of the bore, i.e. on floor 1 or on floor covering 8 applied to floor 1.

In the support on floor 1, the thickness of the floor covering is able to be taken into account with the aid of adjustment screws 20 so that arms 5 are situated at the intended height above the floor. This is so because the floor covering may be retroactively also applied to the edge region of the bore if it had not been provided at the outset already or if it was destroyed and/or at least partially removed because of the production of the stepped bore.

As a result, disk 4 retained by arms 5 is able to be installed in the provided position with the aid of adjustment screws 20, which are screwed through arms 5.

The stepped bore introduced into floor 1 has a step 7, and a corrugated tube 6 installed in floor 1 terminates in the region of the stepped bore situated below step 7.

As illustrated in FIGS. 1 to 4, a sealing element 2 is introduced into the lower region of the stepped bore, which covers the region axially covered by the outlet region in the axial direction, i.e. in the direction of the bore axis of the stepped bore. In addition, sealing element 2 extends axially into the region axially covered by ring frame 3. As a result, the gap region that exists between step 7 and ring frame 3 is covered and casting compound 30 may be filled into this gap region. The gap region extends radially between floor 1 and ring frame 3 and axially up to step 7. Both in the radial direction and in the axial direction, ring frame 3 is set apart from floor 1, in particular from the wall of the stepped bore.

Since ring frame 3 is held by the compensation device, i.e. disk 4, in particular with the aid of connecting screws 21, casting compound 30 is able to be filled into the gap surrounding ring frame 3. Sealing element 2 prevents casting compound 30 from flowing into the region of the stepped bore.

Once casting compound 30 has cured, the compensation device, in particular disk 4 including arms 5, is therefore able to be removed. Ring frame 3 is thus retained in an integral fashion with the aid of casting compound 30 and is therefore connected to floor 1.

Sealing element 2 has a centrally situated axially uninterrupted hole so that it is easily removable from the area of the stepped bore using a finger.

Sealing element 2 is made from a foamed material, in particular plastic, and has a toroidal shape, in particular. Alternatively, sealing element 2 is hollow and provided with a skin of rubber or plastic as the surface, and it is inflatable by compressed air and when inflated, it nestles against the wall of the stepped bore situated axially below step 7 of the stepped bore and also rests against ring frame 3 while restricting the gap. After casting compound 30 has been filled in, the air is released from sealing element 2.

Figure 5:
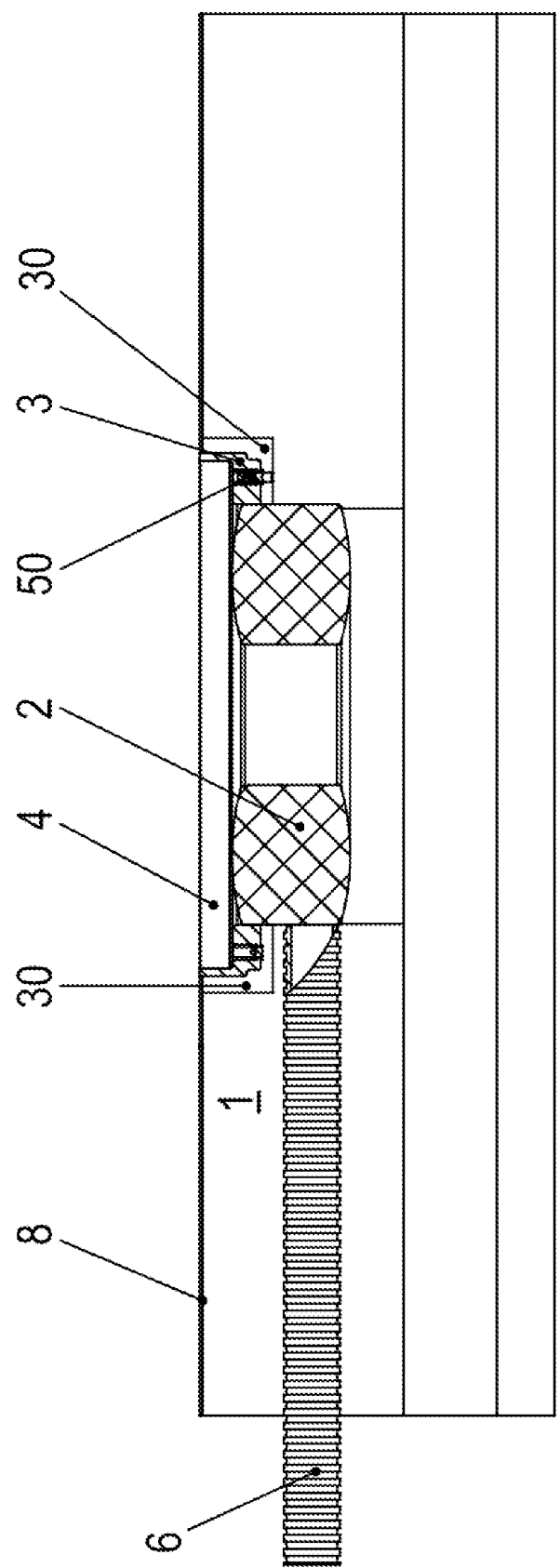
FIG. 5 illustrates an alternative method for aligning ring frame 3.

FIG. 5 shows an alignment of ring frame 3 at the stepped bore as an alternative to the arrangement illustrated in FIGS. 1 to 4.

In this instance, ring frame 3 has axially directed threaded bores at its circumference, into which threaded pins 50 may be screwed so that they allow ring frame 3 to be supported on step 7 of the stepped bore.

As a result, the position of ring frame 3, in particular the height of ring frame 3, is determined by an adaptation of threaded pins 50 with the aid of screws. The axially upper edge region of ring frame 3 is brought to the level of floor covering 8, similar to the arrangement illustrated in FIGS. 1 to 4, so that ring frame 3 is situated at the intended height, at the latest once floor covering 8 has been repaired or applied.

Subsequently, casting compound 30 is introduced in the arrangement according to FIG. 5 as well. Threaded pins 50 remain in casting compound 30.

Figure 6:
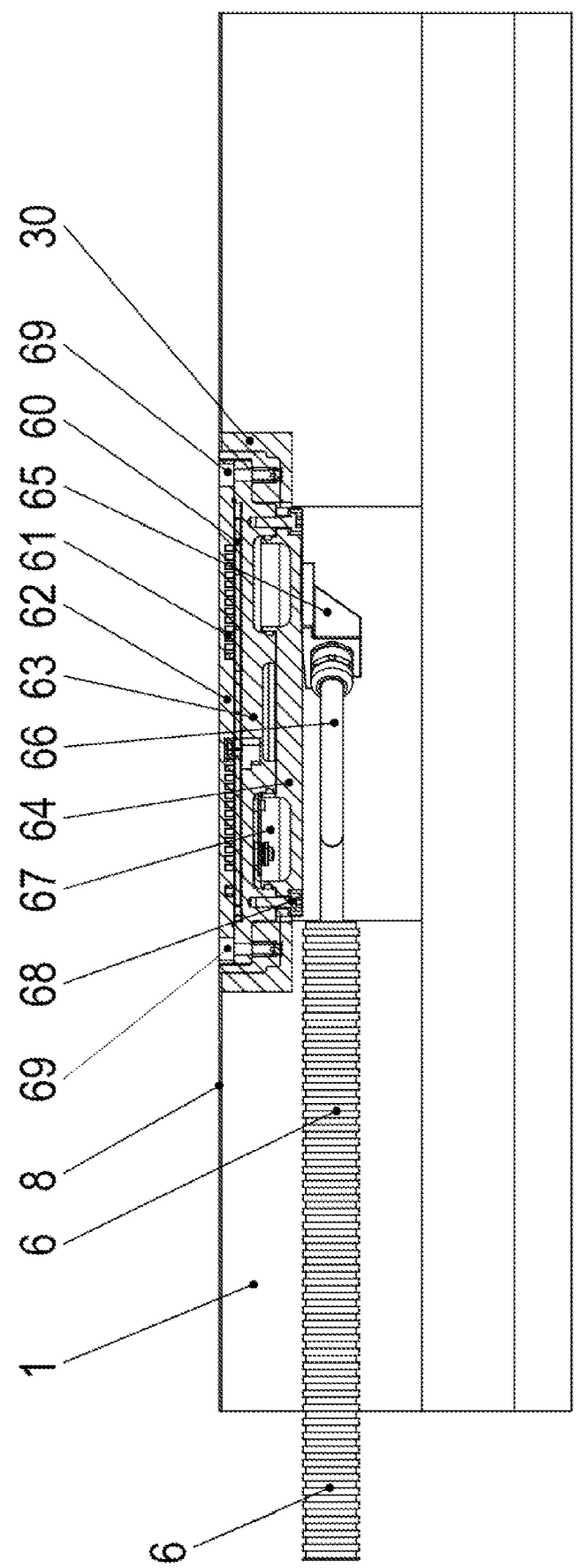
FIG. 6 is a cross-sectional view through the primary unit.
Figure 7:
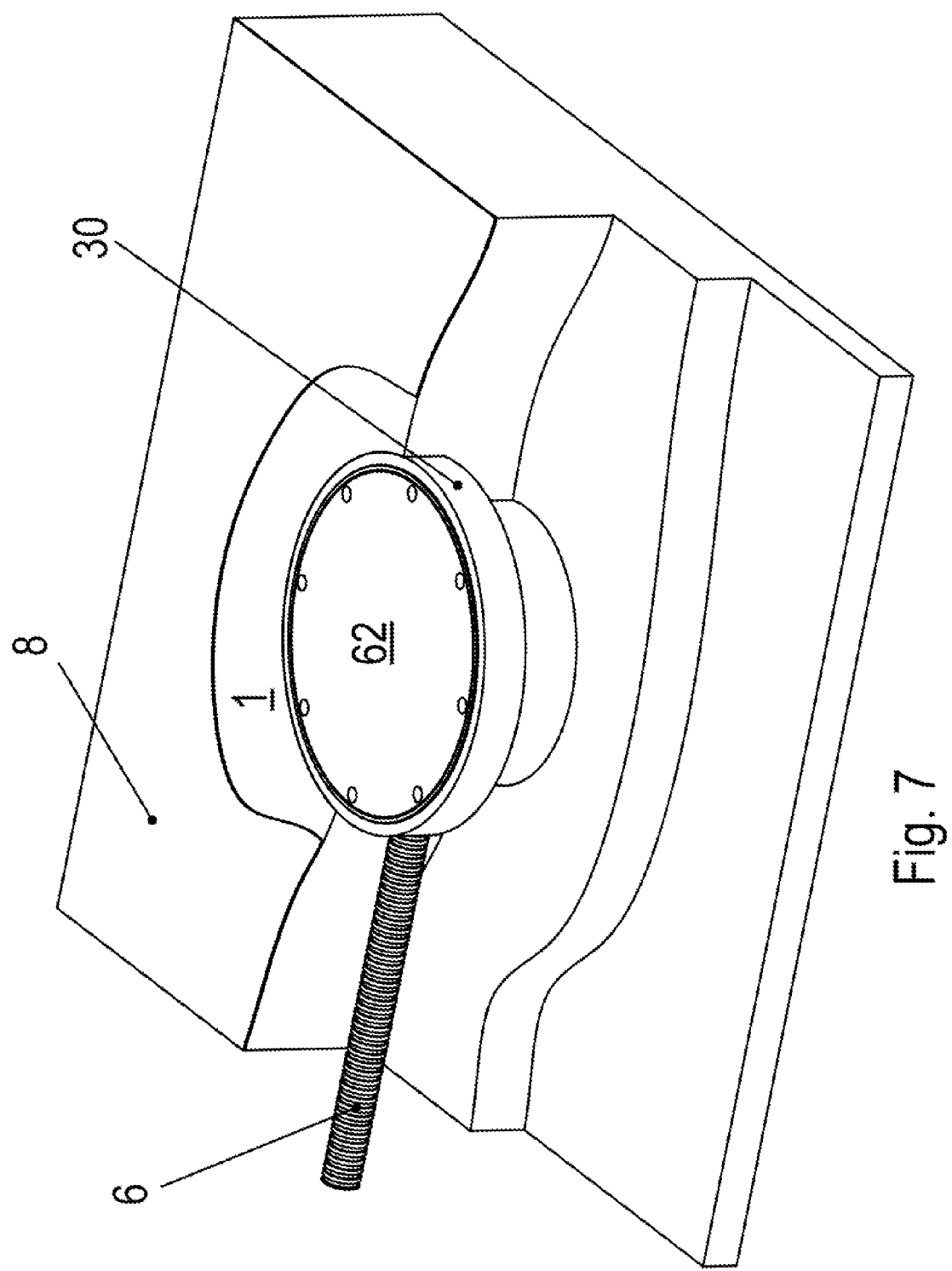
FIG. 7 is a perspective partial cross-sectional view of the primary unit situated in the stepped bore, in a part-sectional view.

FIG. 6 is a cross-sectional view of the charging point to be produced after casting compound 30 has cured and sealing element 2 has been removed.

A spiral-shaped rectangular winding 61 is accommodated in a groove that has a corresponding spiral-shaped rectangular shape and is situated on the underside of a cover part 62. Cover part 62 functions as winding carrier for winding 61.

Cover part 62 has a circular, i.e. circular cylindrical, outer circumference.

Cover part 62 is connected to a receiving part 63. A ferrite layer 60 is accommodated in receiving part 63, which substantially fills a space region in the shape of a circular plate, i.e. a circular cylindrical space region, the ferrite layer being composed of small, adjacently placed cuboidal ferrite parts, for example.

Thus, ferrite layer 60 is situated between cover part 62 and receiving part 63. The space region filled by ferrite layer 60 is restricted by cover part 62 and receiving part 63.

Receiving part 63 is connected to frame part 3 with the aid of screws 69 that penetrate cover part 62 and receiving part 63. Toward this end, frame part 3 has corresponding axially directed threaded bores into which screws 69 are at least partially screwed.

The underside of receiving part 63, i.e. the side of receiving part 63 facing away from cover part 62, is covered by a lower part 64, in particular a lower cover part. An annular space region in which a circuit board 67 is situated is developed between receiving part 63 and lower part 64. The annular space region is developed circumferentially in the circumferential direction, i.e. arranged without any interruption in the circumferential direction.

Capacitors, which are connected in parallel or in series to winding 61, are placed on circuit board 67. The resonant frequency of the oscillating circuit produced in this manner corresponds to the frequency of the current impressed into the winding by a feeder device.

The supply of the current from the feeder device is carried out via a line 66, i.e. cable, which is routed to circuit board 67 through corrugated tube 6 and through a cable gland 65. The housing of cable gland 65 is situated on the underside of lower part 64, i.e. on the side of lower part 64 facing away from receiving part 63.

A further space region in which a controllable illumination device may be provided is centrally situated between receiving part 63 and lower part 64. As a result, it is possible to display information through the illumination device, for which purpose a bore that passes axially through the receiving part has to be created, and the cover part is either produced from a transparent plastic, or a region of the cover part situated above the bore is produced from a transparent material. The bore is filled, for example, with a transparent material. The illumination device is able to be controlled such that the illumination device may be switched on or off, and/or so that the color of the illumination device is controllable. This makes it possible to display different operating states or other information as well.

According to example embodiments, winding 61 is arranged as a flat ring winding. The ring winding has the form of a circular spiral. In this manner, the mobile part is rotatable on the charging point during the transmission of energy, without any fluctuation in the inductive coupling between winding 61 and the secondary winding that is provided on the mobile part and is, for example, likewise implemented as a flat ring winding in the form of a circular spiral. The time required for changing the steering angle of a mobile part having a track drive or some other omnidirectional drive may thus be used for an inductive energy transmission to the mobile part.

Lower part 64 is fastened to receiving part 63 with the aid of screws 68.

Figure 8:
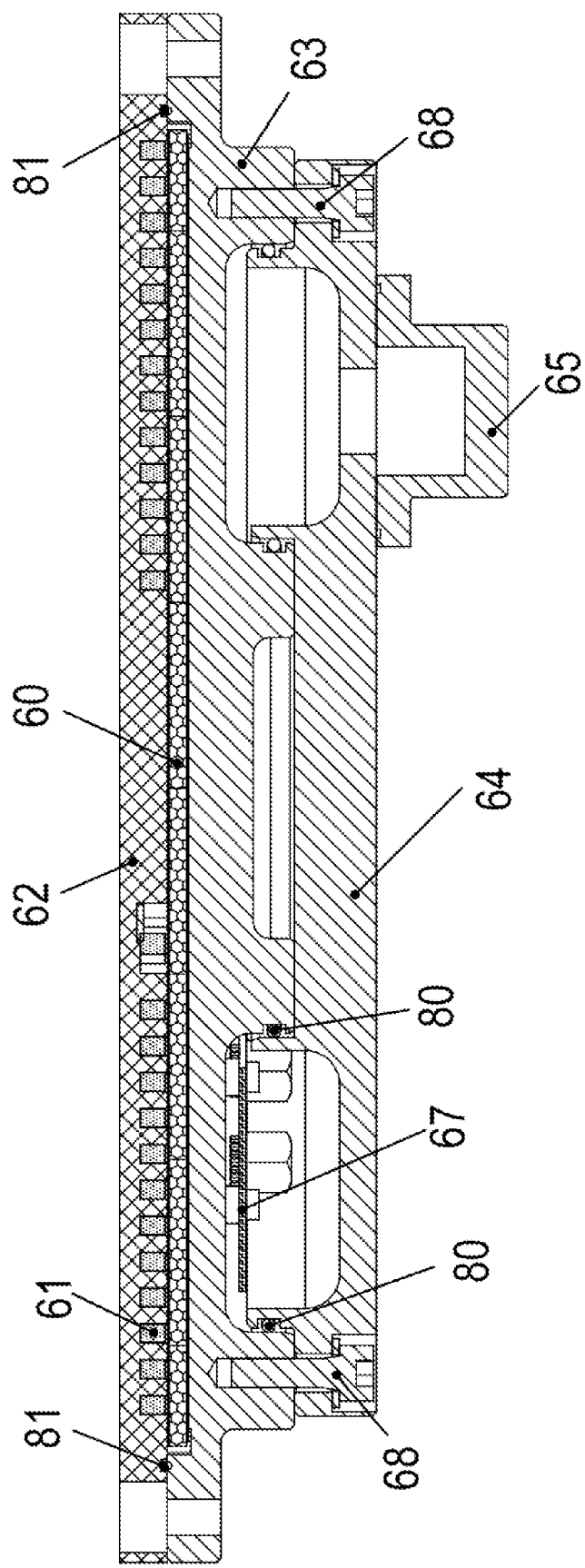
FIG. 8 is a partial cross-sectional view of the primary unit.

As illustrated in FIG. 8, a seal 81, which is situated at a greater diameter than ferrite layer 60 and winding 61, is disposed between cover part 62 and receiving part 63. Seal 81 is, for example, arranged as an O-ring.

A seal 80, which seals the space region accommodating circuit board 67 from the outer environment, is also provided between lower part 64 and receiving part 63.

Figure 9:
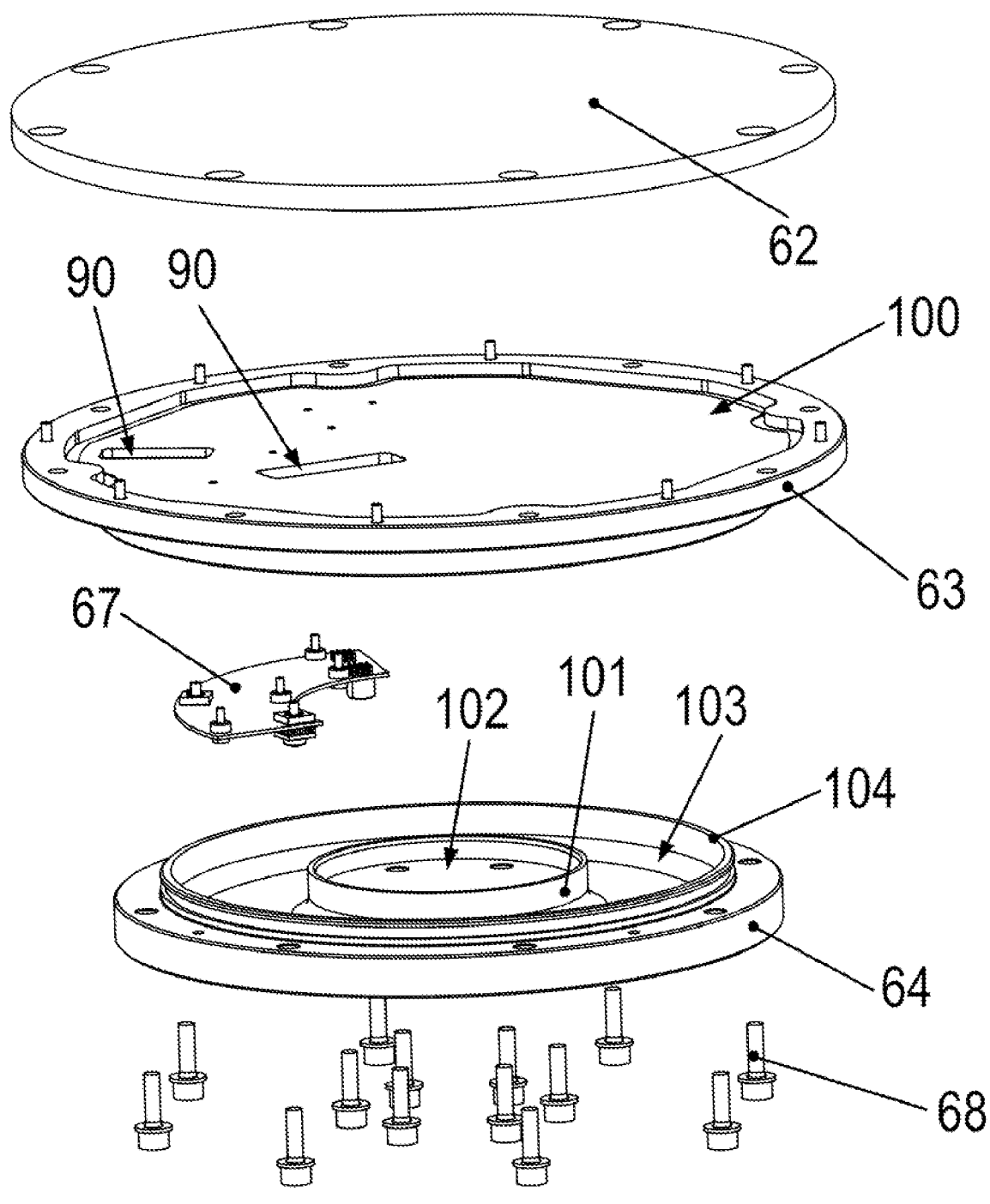
FIG. 9 is an exploded view of the primary unit.
Figure 10:
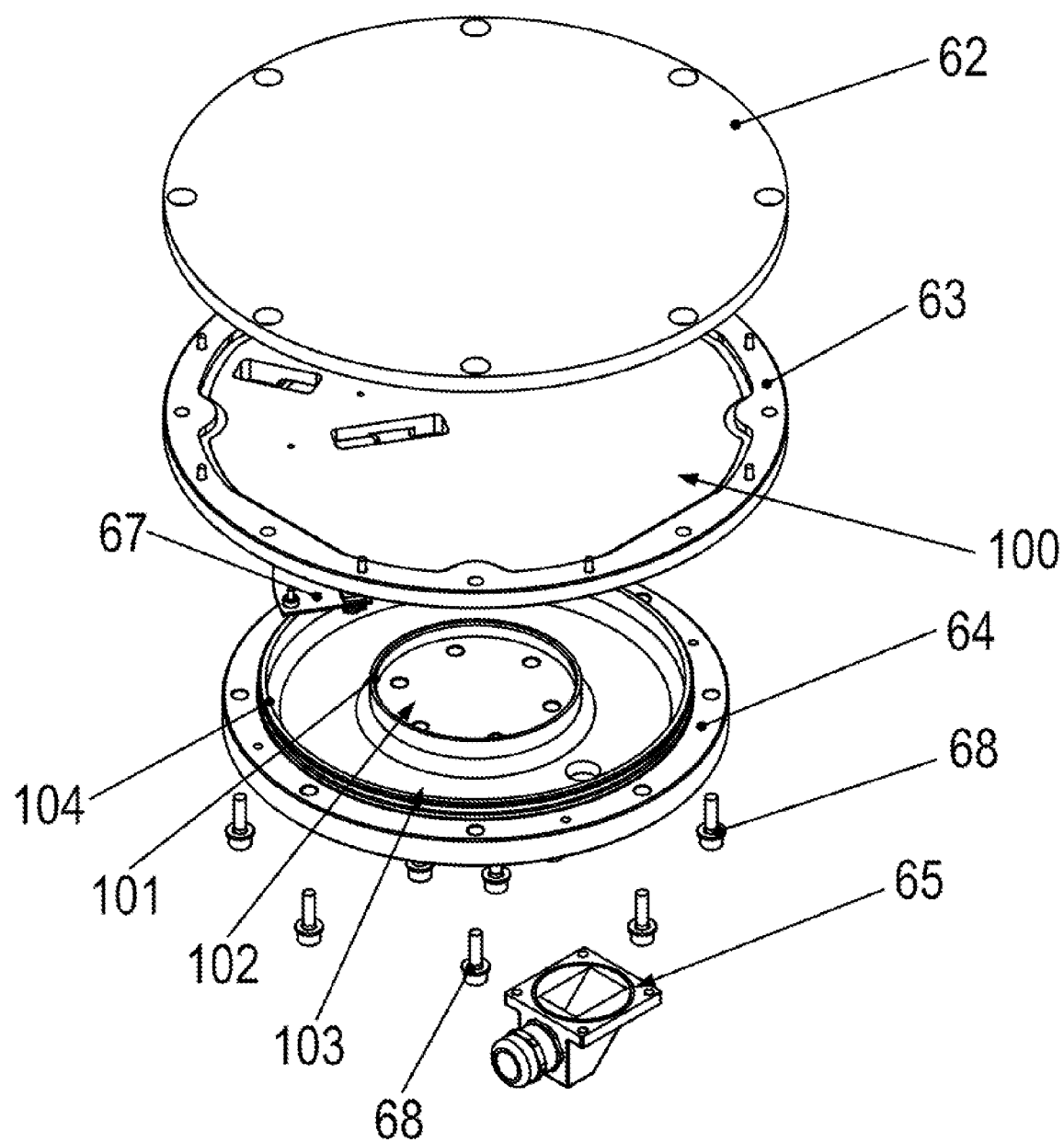
FIG. 10 is an exploded view of the primary unit from a different viewing angle.

As illustrated in FIG. 9 and FIG. 10, ferrite layer 60 is situated in a depression 100 provided on receiving part 63. This depression is located on the upper side of receiving part 63, i.e. on the side facing cover part 62.

Receiving part 63 has two axially uninterrupted recesses 90, which are set apart from each other so that connection lines such as feed line 66 are able to be fed through to circuit board 67.

Recesses 63 terminate on the upper side of receiving part 63 in depression 100.

Lower part 64 has a circumferential ring wall 101 in the circumferential direction, which restricts the space region situated in a centered manner between lower part 64 and receiving part 63.

In addition, lower part 64 has a further circumferential ring wall 104 in the circumferential direction, which is radially set apart from ring wall 101. As a result, the space region accommodating circuit board 67 is restricted by ring wall 101 and ring wall 104.

Lower part 64 is fastened to receiving part 63 with the aid of screws 68, for which purpose receiving part 63 has axially directed threaded bores.

Figure 11:
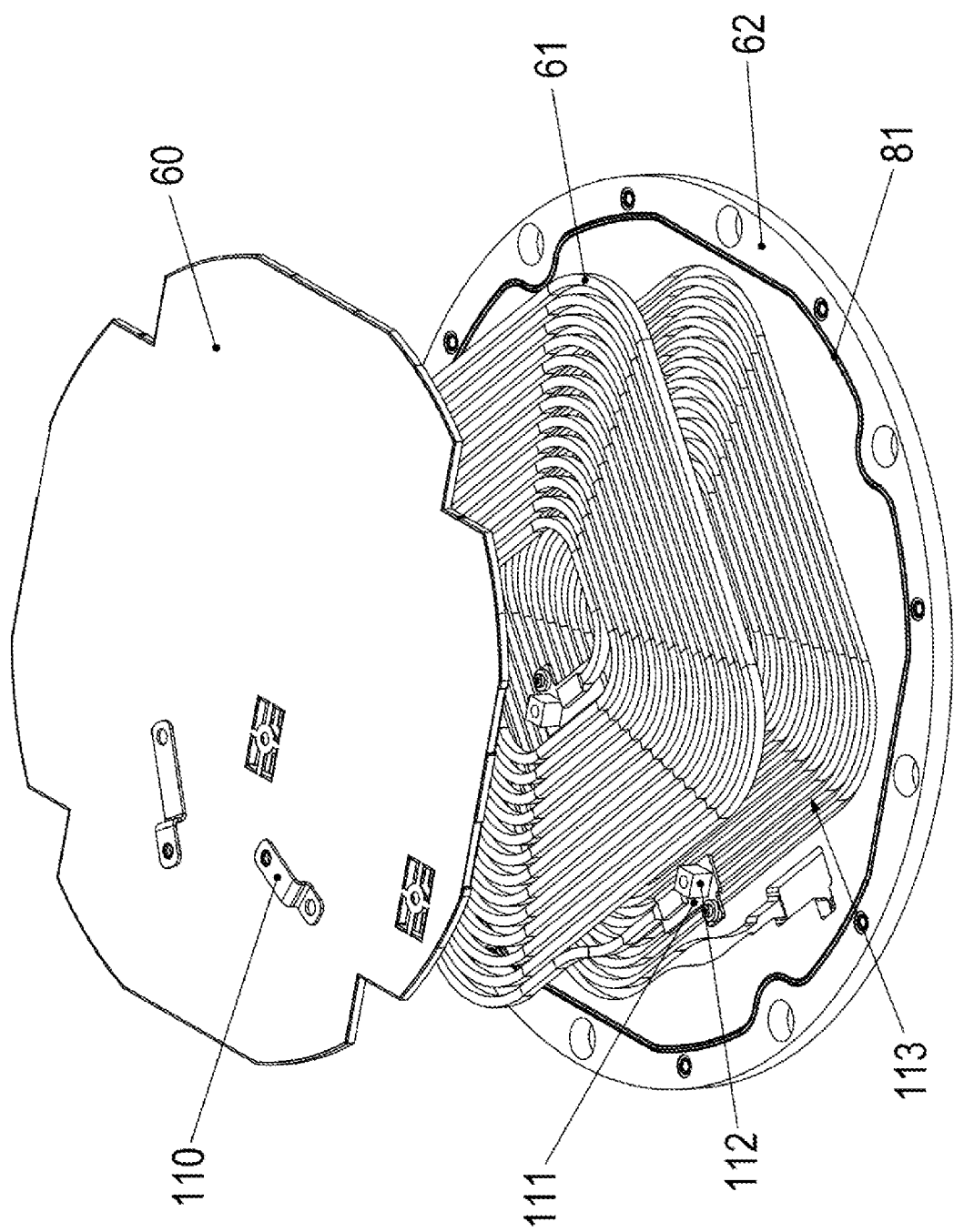
FIG. 11 is an exploded view of an underside of the area of winding 61 of the primary unit.
Figure 12:
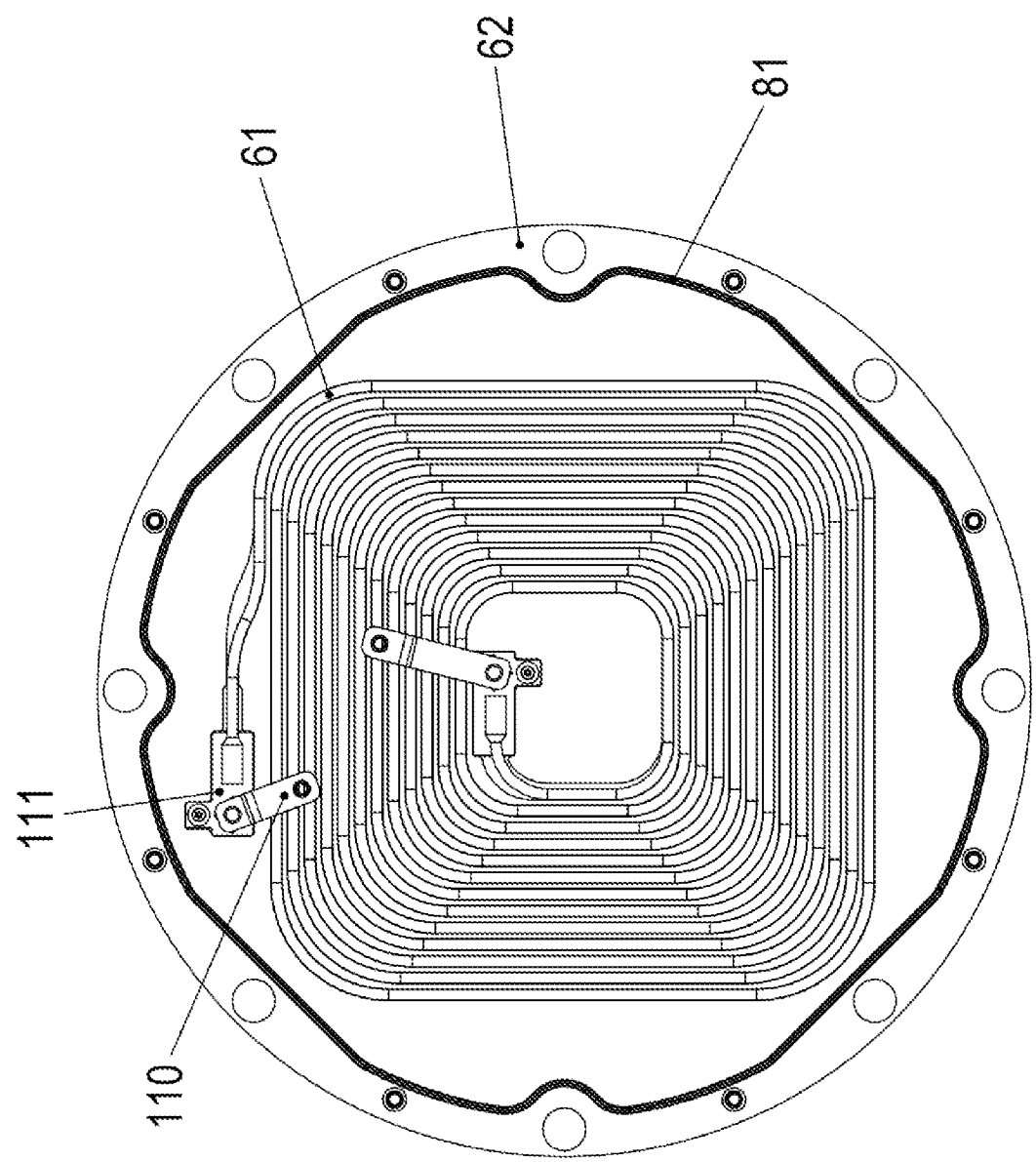
FIG. 12 is a below plan view of this region when the parts are assembled.

As illustrated in FIG. 11, cover part 62 has on its side facing receiving part 63, i.e. its underside, groove 113, which extends in a rectangular, spiral-type form and into which winding 61 is inserted.

The ends of the winding wire of winding 61 arranged as a flat winding are guided out toward adapter boards 111 on which an electrical connection part 112 is mounted in each case. An easy electrical connection is therefore provided. Adapter boards 111, i.e. circuit boards, are screw-fitted, and thus are electrically connected to current bars 110, which are electrically connected to circuit traces of circuit board 67.

Current bars 110 are situated on the side of the ferrite layer that faces away from cover part 60.

Seal 81 may be arranged as a foam seal.

Ring walls 101 and 104 premolded on lower part 64 are situated on the side of lower part 64 that faces receiving part 63. Ring walls 101 and 104 touch receiving part 63 so that the annular space region in which circuit board 67 is situated is provided radially between them.

LIST OF REFERENCE NUMERALS 1 floor, in particular concrete
2 sealing element
3 ring frame
4 disk, in particular circular disk
5 arm
6 corrugated tube
7 step of the stepped bore
8 floor covering
20 adjustment screw
21 connecting screw
30 casting compound
50 threaded pin
60 ferrite layer
61 winding, in particular rectangular winding
62 cover part as winding carrier
63 receiving part
64 lower part, in particular lower cover part
65 housing of the cable gland
66 feed line
67 circuit board
68 screw
69 screw
80 seal
81 seal
90 recess
100 depression
101 ring wall
102 depression
103 depression
104 ring wall
110 bus bar
111 adapter board
112 electrical connection part
113 groove, in particular groove having the shape of a rectangular winding

What is claimed is:

1. An apparatus for installing, in a stepped bore of a floor, a primary part of a system for inductively transmitting energy to a mobile part, comprising:
a sealing element adapted to be introduced into a lower region of the stepped bore having a smaller diameter than an upper region of the stepped bore to partially extend axially into the upper region of the stepped bore;
a ring frame adapted to be introduced into the upper region of the stepped bore to at least partially overlap the sealing element in an axial direction of the stepped bore; and
an alignment unit detachably connectable to the ring frame and adapted to align an upper edge region of the ring frame with a surface of the floor.

2. The apparatus according to claim 1, wherein the alignment unit is adapted to space an outer periphery of the ring frame from the stepped bore to form a gap between the ring frame and the stepped bore.

3. The apparatus according to claim 1, wherein the alignment unit is detachably connectable to the ring frame by screws.

4. The apparatus according to claim 1, wherein the alignment unit includes a plurality of radially extending arms, each arm including an axially oriented adjustment screw adapted to engage the surface of the floor.

5. The apparatus according to claim 1, wherein an outer periphery of the sealing element is adapted to releasably engage a surface of the lower region of the stepped bore.

6. The apparatus according to claim 1, wherein the sealing element is toroidally shaped.

7. The apparatus according to claim 1, wherein the sealing element is inflatable and is adapted to releasably engage, in an inflated state, against a wall of the lower region of the stepped bore and against an inner circumferential surface of the ring frame.

8. The apparatus according to claim 5, wherein the outer periphery of the sealing element is adapted to releasably engage an inner circumferential surface of the ring frame.

9. The apparatus according to claim 1, further comprising a casting compound adapted to fill a gap region that extends radially between the floor and the ring frame and that extends axially between the surface of the floor and a step of the stepped bore that transitions between the upper region and the lower region.

10. The apparatus according to claim 1, further comprising a core drill adapted to introduce the stepped bore into the floor.

11. The apparatus according to claim 1, wherein the floor includes a concrete floor.

12. The apparatus according to claim 9, wherein the sealing element is adapted to engage against a wall of the lower region of the stepped bore to prevent the casting compound from flowing into the lower region of the stepped bore.

13. The apparatus according to claim 12, wherein the sealing element is adapted to be removed from the stepped bore after the casting compound has cured.

14. The apparatus according to claim 12, wherein the alignment unit is adapted to be detached from the ring frame after the casting compound has cured.

15. The apparatus according to claim 12, wherein the casting compound is adapted to retain the ring frame in the upper region of the stepped bore after the casting compound has cured.

16. The apparatus according to claim 1, further comprising a winding adapted to be arranged inside the ring frame after the ring frame is installed in the floor.

17. The apparatus according to claim 16, further comprising a cover adapted to cover the winding inside the ring frame.

18. The apparatus according to claim 17, wherein the cover is adapted to align with the surface of the floor.

19. The apparatus according to claim 17, further comprising a seal arrangeable between the cover and the ring frame to seal interior space between the cover and the ring frame.

20. An apparatus for installing, in a stepped bore of a floor, a primary part of a system for inductively transmitting energy to a mobile part, comprising:
a sealing element adapted to be introduced into a lower region of the stepped bore having a smaller diameter than an upper region of the stepped bore to partially extend axially into the upper region of the stepped bore; and
a ring frame adapted to be introduced into the upper region of the stepped bore to at least partially overlap the sealing element in an axial direction of the stepped bore;
wherein the ring frame includes axially-directed threaded pins adapted to engage a step of the stepped bore that transitions between the upper region and the lower region, the threaded pins adapted to align an upper edge region of the ring frame with a surface of the floor.

* * * * *